Oct. 26, 1954  C. G. PULLIN ET AL  2,692,650
PITCH CONTROL MECHANISM FOR ROTOR BLADES
Filed Aug. 4, 1947
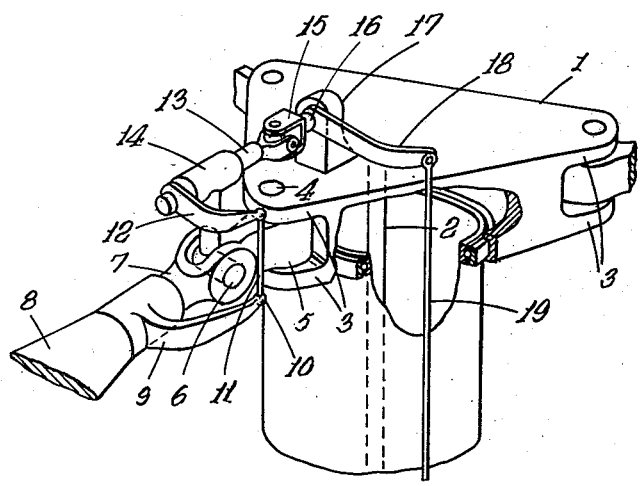
INVENTORS
Cyril George Pullin
Kenneth Watson
BY
ATTORNEYS Patented Oct. 26, 1954

2,692,650

UNITED STATES PATENT OFFICE 2,692,650

PITCH CONTROL MECHANISM FOR ROTOR BLADES

Cyril George Pullin, Tadburn, Ampfield, and Kenneth Watson, Woolston, Southampton, England, assignors, by mesne assignments, to Autogiro Company of America, Philadelphia, Pa., a corporation of Delaware Application August 4, 1947, Serial No. 765,858

Claims priority, application Great Britain November 19, 1946

5 Claims. (Cl. 170—160.25)

This invention relates to improvements in mechanism for controlling the blade pitch angles of a rotor of a helicopter, rotaplane or like rotary-winged aircraft of the type in which the rotor has radially disposed blades and rotates on a substantially vertical axis, the blades being mounted by means of pitch-angle varying pivots for rotation about their spanwise axes on blade stubs articulated to the hub by a linkage includingn two non-intersecting pivots—usually known as drag and flapping pivots—both substantially perpendicular to the blade's spanwise axis, both of said pivots being offset from the axis of rotation of the hub, said linkage also including a connecting member—usually known as a drag link—articulating on both said pivots.

The main objects of the invention are to ensure on the one hand that displacements of a blade on its flapping pivot or/and drag pivot do not disturb the pitch angle, e. g. so as to introduce the so-called Delta three effect, and on the other hand that cyclic variation of pitch-angle is correctly phased with respect to control displacement, i. e. that its phase is advanced 90° in the direction of rotation from the azimuth of control column displacement, (with the usual convention as to algebraic signs). A further object is to provide the designer with a more extended range of choice of selectable ratios, dimensions, ranges of movement and the like characteristics of the mechanism than is available with conventional arrangements.

A mechanism according to this invention, as broadly conceived, comprises a train of mechanical elements for converting axial (linear) or/and angular displacements of a swash-plate into pitch-changing angular displacements of a rotor blade, said train including a lever whose extremity is connected to a link forming part of the train, at a point which lies on the axis of either the drag or the flapping pivot when the blade-pitch-angle has its mean or average value in the normal collective pitch setting, and a jointed shaft or other torque-transmitting member aligned in the general direction of the spanwise blade-axis and comprising two parts, of which one is supported by a bearing mounted on the drag link, and which are connected together by a universal joint centred on the pivot (drag or flapping) other than that on whose axis the lever-link connection is aligned (in the mean pitch-setting), the axes of both parts of the shaft or torque-transmitting member being substantially perpendicular to the last mentioned pivot axis.

One specific form of mechanism in accordance with the invention, includes a universally jointed shaft, of which one shaft part is supported by a bearing mounted on the drag link, its axis being perpendicular to both drag and flapping pivot axes, and offset with respect to one of them the drag and flapping pivot axes, but intersecting the other, and the other shaft part is supported by a bearing rapidly mounted on the hub and is provided with a lever connected with the swash-plate by a link lying in a plane containing the axis of rotation of the hub, while the blade carries a lever articulating with a second link at a point which, when the blade has its mean or average pitch-angle, lies on the axis of the pivot (drag or flapping), whose axis does not pass through the universal shaft-joint, the second link being connected to a lever on the drag-link-supported shaft part.

This mechanism fulfils the requirements, (a) that Delta three is zero, and (b) that the phase of the cyclic pitch oscillation is advanced 90° in the direction of rotation from the azimuth of angular displacement of the swash-plate axis (with the usual convention as to algebraic signs), irrespectively of the offsets of the drag and flapping pivots from the axis of rotation, and irrespectively of displacements about the drag and flapping pivots.

The invention will be better understood from the following description with reference to the accompanying drawing which is a perspective view, partly cutaway, of a rotor hub and the blade articulation of the pitch varying mechanism of one blade, the others being omitted.

The specific example of mechanism in accordance with the invention which is shown in the drawing is applied to a helicopter rotor with both flapping and drag pivots offset from the axis of rotation and with the drag links articulated to the hub on the drag pivots.

The hub 1, driven by a central shaft 2 which defines the axis of rotation, is provided with forked lugs 3 carrying drag pivot pins 4 which are parallel to the axis 2 and offset radially therefrom. The drag pivots support drag links 5 carrying flapping pivot pins 6, perpendicular to the drag pivot pins and further offset from the axis 2 than the drag pivots. On the flapping pivots are mounted forked stubs 7 on which the blades 8 are supported by bearings (not shown) whose axes are perpendicular to both drag and flapping pivot axes and coincide with the spanwise axes of the blades, enabling the pitch of the latter to be varied.

Each blade is provided with a lever 9 jointed at 10 to a link 11 which is in turn jointed to a lever 12 mounted on a shaft 13, supported in a bearing bracket 14 rigidly mounted on the drag link 5. The shaft 13 is universally jointed at 15 to a shaft 16, supported in a bearing bracket 17 rigidly mounted on the hub 1, and shaft 16 carries a lever 18 jointed to a substantially vertical link 19 which is operated by a swash-plate mechanism for cyclic and collective pitch control.

The joint 10 of lever 9 lies on the axis of the flapping pivot 6, when the pitch of the blade has its mean value, as regards cyclic pitch control, at the normal operative setting of the collective pitch control. The link 11 then lies in the plane containing the flapping pivot axis and parallel to the drag pivot axis, and in the particular example illustrated is perpendicular to the flapping pivot axis. The axis of shaft 13 is perpendicular to both drag and flapping pivot axes, and intersects the former at the centre of universal joint 15, but is offset from the flapping pivot axis; and the axis of shaft 16 intersects the drag pivot axis at the centre of the joint 15 and is aligned with that of shaft 13 when the rotor is under power (at, say normal cruising power input), in which condition the drag link lags behind the plane containing the axis of rotation 2 and the axis of the drag pivot 4, with respect to the direction of rotation (counter-clockwise when viewed from above). Finally, the link 19 lies in a plane containing the axis of rotation 2 and perpendicular to the axis of shaft 16. In the particular example illustrated the link 19 is parallel to the rotational axis 2.

It will be seen that the lengths of levers 9, 12 and 18, perpendicular to their axes, are all selectable at the will of the designer within the limitations of space at his disposal and that by appropriately selecting the ratios of these lengths a wide choice of the ratio of pitch-angle variation to swash-plate displacement angle is available to the designer.

It will also be evident that the facts that the flapping and drag pivot axes respectively pass through the joints 19 and 15 ensure that there is no Delta three effect, i. e. Delta three equals zero, and that displacements about the drag pivot do not affect the pitch angle; further that the fact that link 19 is in a plane containing the axis of rotation and perpendicular to shaft 16 and hence to the radial plane containing the blade, when in its normal mean operation position, ensures the required 90° phase displacement between the cyclic pitch oscillation and the azimuth of swash-plate-axis displacement.

The installation in a helicopter of the rotor hub assembly and control means is not illustrated, since it may be carried out in accordance with conventional practice.

Pitch angle varying mechanisms constructed according to the invention have the advantage that the blade pitch angle is not affected by flapping or to any serious extent by angular displacements about the drag pivot so that undesirable Delta three effects and dependence of blade pitch angle on rotor torque are largely suppressed. This follows from the centering of the universal joint of the pitch-controlling shafting on one of the drag and flapping pivot axes and the alignment of the lever-link connection on the other of these pivot axes; and the advantage is achieved without requiring that the drag and flapping pivot axes should intersect one another, this being a restriction on design that would frequently prove undesirable. Furthermore, such a mechanism does not suffer from the disadvantages associated with mechanisms having jointed pitch-varying torque rods which are brought right into the hub, in particular the difficulty of accommodating the operating mechanism of the torque-rods within a hub of reasonable dimensions.

The mechanism also has the advantage of affording great flexibility of design, in that the "gear-ratio" between pitch-angle variation and swash-plate inclination can be selected within wide limits. In the form illustrated the flapping pivot offset must be greater than the drag pivot offset, the flapping pivot being outboard of the drag pivot, but this type of articulation has the advantage of eliminating the small variable Delta three effect associated with articulations in which the flapping pivot is inboard of the drag pivot due to the change of angle between the span-wise axis of the blade and the flapping pivot axis, as a consequence of varying displacement of the blade on the drag pivot with varying applied torque, between the extremes of full-power operation and autorotation. The mechanism can moreover be adapted within the scope of the invention to rotors having the flapping pivot inboard of the drag pivot, by disposing the jointed shaft 13, 15, 16 in front of the blade articulation, instead of above it, with the joint 15 aligned on the flapping pivot axis, and the levers 9, 12 disposed vertically with the joint 10 aligned on the drag pivot axis.

We claim:

1. In an aircraft having a sustaining rotor incorporating a rotor blade pivotally mounted on drag, flapping and pitch change pivots, with flapping pivot spaced radially outwardly from the drag pivot and connected thereto by a drag link and with the pitch pivot disposed outboard of the flapping pivot, pitch control mechanism comprising a torque transmitting connection, journal means therefor on said drag link and an arm and link connection between said first named connection and the blade, the torque transmitting connection incorporating an angling joint and the arm and link connection also incorporating an angling joint, said angling joints being positioned one in alignment with the axis of the flapping pivot and the other in alignment with the axis of the drag pivot.

2. A construction in accordance with claim 1 in which the angling joint in the torque transmitting connection is positioned in alignment with the axis of the drag pivot and in which the angling joint between the arm and link is positioned in alignment with the flapping pivot axis.

3. In an aircraft having a sustaining rotor incorporating a rotor blade pivotally mounted on drag, flapping and pitch change pivots, with the flapping pivot spaced radilly outwardly from the drag pivot and with the pitch pivot disposed outboard of the flapping pivot, pitch control mechanism comprising a pitch control arm connected with the blade, a link connected by an angling joint with said arm at a point substantially along the axis of the flapping pivot, a universally jointed torque transmitting device connected at one end with said link, with the universal joint thereof disposed along the axis of the drag pivot, and control linkage operatively connected to the other end of the torque transmitting device.

4. In an aircraft having a sustaining rotor incorporating a hub and a blade pivotally connected with the hub, the pivotal connection comprising a drag link pivoted to the hub by means of a drag pivot, and flapping and pitch pivots interconnecting the blade with the drag link with the pitch pivot disposed outboard of the flapping pivot, pitch control mechanism comprising a pair of torque transmitting shafts offset from but extended generally parallel to the blade axis, one of said shafts being journaled on the hub and the other being journaled on the drag link, a universal joint interconnecting said shafts and located substantially in alignment with the axis of the drag pivot, a pair of arms secured respectively to the blade and to the shaft which is journaled on the drag link, and a link pivotally interconnecting said arms, the pivot between said link and the arm secured to the blade being located along the axis of the flapping pivot.

5. In an aircraft having a sustaining rotor incorporating a rotor blade pivotally mounted on drag, flapping and pitch change pivots, with the flapping and drag pivots interconnected by a link and with the pitch pivot disposed outboard of the flapping and drag pivots, pitch control mechanism comprising a torque transmitting connection, journal means therefor on said link and an arm and link connection between said first named connection and the blade, the torque transmitting connection incorporating an angling joint and the arm and link connection also incorporating an angling joint, said angling joints being positioned one in alignment with the axis of the flapping pivot and the other in alignment with the axis of the drag pivot.

References Cited in the file of this patent

UNITED STATES PATENTS

| Number | Name | Date |
|---|---|---|
| 1,971,016 | Pecker | Aug. 21, 1931 |
| 2,030,578 | Flettner | Feb. 11, 1936 |
| 2,256,635 | Young | Sept. 23, 1941 |
| 2,330,842 | Pullin | Oct. 5, 1943 |
| 2,338,923 | Focke | Jan. 11, 1944 |
| 2,352,342 | Pitcairn | June 27, 1944 |
| 2,380,582 | Cierva | July 31, 1945 |
| 2,402,349 | Sikorsky | June 18, 1946 |
| 2,405,777 | Buivid | Aug. 13, 1946 |
| 2,415,148 | Sikorsky | Feb. 4, 1947 |
| 2,418,030 | Hirsch | Mar. 25, 1947 |
| 2,428,200 | Campbell | Sept. 30, 1947 |
| 2,430,767 | Hirsch | Nov. 11, 1947 |

FOREIGN PATENTS

| Number | Country | Date |
|---|---|---|
| 796,870 | France | Apr. 16, 1936 |